3,485,798
1 - ACYLBICYCLO[1.1.0]BUTANES, THEIR
HOMOPOLYMERS AND THEIR 1-ACYL-
3 - HALOCYCLOBUTANE PRECURSORS,
AND THEIR PREPARATION
Claibourne D. Smith, Kynlyn, Wilmington, Del., assignor
to E. I. du Pont de Nemours and Company, Wilmington, Del., a corporation of Delaware
No Drawing. Filed Feb. 10, 1967, Ser. No. 615,059
Int. Cl. C08f 13/00; C07c 49/43
U.S. Cl. 260—63    10 Claims

ABSTRACT OF THE DISCLOSURE

1-Acylbicyclo[1.1.0]butanes of the formula (1)
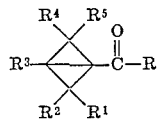

where R is hydrogen, hydrocarbyl or substituted hydrocarbyl, and $R^1$–$R^5$ are hydrogen or selected hydrocarbyl groups.

1-Acyl-3-halocyclobutanes of the formula (2)
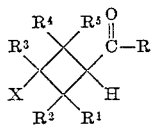

where R–$R^5$ are defined as above and X is a halogen.

Homopolymers of (1) which are solid, thermoplastic polymers of high molecular weight.

The process of dehydrohalogenating compounds of Formula 2 with a dehydrohalogenating agent to obtain compounds of Formula 1.

The process of polymerizing a compound of Formula 1 to obtain a homopolymer.

BACKGROUND OF THE INVENTION

Field of the invention

This invention relates to 1-acylbicyclo[1.1.0]butanes and their homopolymers; to 1-acyl-3-halocyclobutane precursors; and to their preparation.

Description of the art

Of the art which has come to the attention of the applicant prior to the filing of this application, no references describing 1-acylbicyclo[1.1.0]butanes or their 1-acyl-3-halocyclobutane precursors were found.

SUMMARY OF THE INVENTION

The novel compositions of this invention are those selected from the group consisting of:

(A) A 1-acylbicyclo[1.1.0]butane represented by the formula (1)
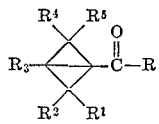

wherein R is hydrogen, hydrocarbyl of 1 to 19 carbon atoms, or substituted hydrocarbyl of 1 to 19 carbon atoms in which the substituents are selected from halogen (fluoro, chloro or bromo), lower alkoxy or mixtures thereof; and $R^1$ through $R^5$, individually, are each hydrogen or hydrocarbyl of 1 to 19 carbon atoms that is free of aliphatic unsaturation (i.e., free of aliphatic ethylenic or acetylenic carbon-to-carbon bonds);

(B) A 1-acyl-3-halocyclobutane represented by the formula (2)
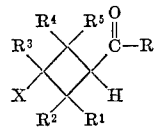

wherein R through $R^5$ are each defined as above and X is halogen of atomic number 17 through 53 (chlorine, bromine or iodine); and (C) A homopolymer of 1-acylbicyclo[1.1.0]butane represented by the recurring unit (3)
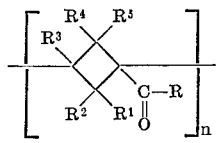

wherein R through $R^5$ are each defined as above, $n$ is a whole number greater than 4.

The process aspect of the invention is, firstly, the process of dehydrohalogenating a compound of Formula 2 with a dehydrohalogenating agent, preferably in an inert atmosphere, to produce a compound of Formula 1; and, secondly, the process of homopolymerizing a compound of Formula 1 in the presence of an initiator and at a temperature of between −100° C. and 160° C.

DESCRIPTION OF THE PREFERRED EMBODIMENTS

The term "hydrocarbyl" as used herein in the definition of R represents radicals composed of hydrogen and carbon. It may be alkyl, alkenyl, alkadienyl, alkynyl, cycloalkyl, cycloalkenyl, aryl, alkaryl, aralkyl, aralkenyl, and the like. The term "hydrocarbyl . . . free of aliphatic unsaturation" as used herein in the definitions of $R^1$ through $R^5$ represents radicals such as alkyl, cycloalkyl, aryl, alkaryl, aralkyl, and the like.

Preferably, R, in any of the above formulas is hydrogen, lower alkyl or phenyl; while $R^1$ through $R^5$ are each hydrogen or lower alkyl. More preferably, $R^1$, $R^2$, $R^4$, and $R^5$ are each hydrogen; while $R^3$ is hydrogen or lower alkyl. X in Formula 2 is preferably chlorine.

The 1-acyl-3-halocyclobutanes of Formula 2 may be prepared by the reaction of a Grignard reagent RMgX with a 1-cyano-3-halocyclobutane followed by acid hydrolysis, as described in Examples 1 and 2. They may also be prepared by treating a 1-cyano-3-alkylenecyclobutane with a Grignard reagent RMgX to obtain a 1-acyl-3-alkylenecyclobutane to which HX is then added to obtain a 1-acyl-3-halo-3-alkylcyclobutane, as described in Examples 4 and 5. In the reaction of a 1-cyano-3-halocyclobutane with a Grignard reagent RMgX where R is alkyl or cycloalkyl, there is formed in addition to a 1-acyl-3-halocyclobutane, as a by-product the corresponding 1-cyanobicyclo[1.1.0]butane. If sufficient Grignard reagent is present, it reacts with the 1-cyanobicyclo[1.1.0] butane to yield the corresponding 1-acylbiocyclo-[1.1.0] butane.

The dehydrohalogenation process of this invention is carried out by the action of a dehydrohalogenating agent. Suitable agents include alkali metal hydrides such as sodium hydride, lithium hydride, and the like, and other strong bases such as potassium t-butoxide, sodium methoxide, and the like. The dehydrohalogenation may be carried out at temperatures in the range of −80 to +100° C. It is convenient, though not essential, to carry out the dehydrohalogenation in the presence of a reaction medium which is inert to the reactants and products. Suitable media include ethers such as diethyl ether, the dimethyl ether of ethylene glycol, tetrahydrofuran, and the like, dimethylformamide, dimethyl sulfoxide, N-methylpyrrolidone, and the like. The reaction may be carried out in air, but best yields are obtained when an inert atmosphere is employed, such as nitrogen, helium argon, and the like.

Compounds of Formula 1 wherein R is hydrogen are prepared by reacting a hydrocarbyl 3-chlorocyclobutane carboxylate with lithium tri-tert-butoxyaluminohydride in tetrahydrofuran, as described in Example 3, to obtain 3-chlorocyclobutane carboxaldehyde, which is dehydrohalogenated as described above.

The homopolymers of this invention are prepared by reacting a 1-acylbicyclo[1.1.0]butane monomer in bulk, dispersion, emulsion or in solution in an inert organic solvent at a temperature of $-100°$ to $160°$ C. in the presence of an initiator selected from a free-radical-generating initiator, an anionic initiator, a cationic initiator, or a coordination-type initiator.

The free-radical-generating initiators may be selected from a wide variety of compounds representative of this type of initiator. Included are the azo initiators, for example, $\alpha,\alpha$-azodiisobutyronitrile, 1,1'-azodicyclohexanecarbonitrile, dimethyl $\alpha,\alpha$-azodiisobutyrate and $\alpha,\alpha$-azodiisobutyramide, and the organic peroxides and hydroperoxides, for example, dibenzoyl peroxide, di-t-butyl peroxide, and t-butyl hydroperoxide. The initiators can be used in proportions ranging from 0.01 to 10 weight percent of the monomer being polymerized. Other sources of free radicals for initiating polymerization may also be used such as electron bombardment, ultraviolet light in the presence of a sensitizer, and the like. Free-radical-generating initiators are preferred with monomers of Formula 1 in which $R^3$ is hydrogen.

Suitable solvents and/or dispersion media for the free-radical polymerization include water, hydrocarbons such as benzene and hexane, chlorinated aromatic hydrocarbons such as chlorobenzene, nitriles such as acetonitrile, amides such as dimethylformamide and N-methylpyrrolidone, sulfoxides such as tetramethylenesulfoxide and the like. As indicated above, it is not essential that a solvent or dispersion medium be used, and bulk polymerizations can be carried out.

A wide variety of anionic initiators are operable herein for the polymerization of 1-acylbicyclo[1.1.0]butanes. Representative anionic initiators that can be used include the alkali metal alkyls, for example, n-butyllithium and methyllithium; the alkali metal alkoxides, for example, potassium t-butoxide and sodium methoxide; and the alkali metal aryls, for example, sodium naphthalene. The concentration of anionic initiator employed can range from 0.01 to 10 weight percent of the monomer being polymerized. The order of addition of the monomer and the initiator is not critical.

Suitable reaction media for the anionic polymerization include ethers, for example, diethyl ether, tetrahydrofuran, and the dimethyl ether of ethylene glycol; hydrocarbons, for example, benzene and hexane; chlorinated hydrocarbons, for example, chlorobenzene; and amides, for example, dimethylformamide. The ethers are preferred.

Representative cationic initiators which may be used include boron trifluoride and trichloride, aluminum trichloride, silicon tetrafluoride, phosphorus and arsenic tri- and pentafluorides and chlorides, aluminum tribromide, titanium tetrachloride, ferric chloride and the like. The concentration of initiator may be from 0.01 to 10 weight percent of the monomer being polymerized.

Coordination-type initiators usually involve a combination of a lower valent transition metal chloride with an organometallic compound. Specific combinations which are useful include diisobutylaluminum chloride with vanadium tris(acetylacetonate), diisobutylaluminum chloride with vanadium oxychloride), triisobutylaluminum with titanium tetrachloride, methlymagnesium bromide with titanium tetrachloride, lithium aluminumtetraecyl with titanium tetrachloride and the like. The concentration of initiator may be from 0.01 to 10 weight percent of the monomer being polymerized.

Preferred reaction media for carrying out polymerizations initiated by coordination-type catalysts or the cationic catalysts are the hydrocarbons, particularly aliphatic hydrocarbons such as hexane and cyclohexane and the halogenated hydrocarbons such as tetrachloroethylene.

Reaction times can vary from a few seconds, i.e., 5 to several days, for example, two to three days or more depending on the particular monomer, initiator, solvent, and reaction temperature employed.

Pressures above and below atmospheric pressure are operable. Atmospheric and superatmospheric pressures are preferred.

The homopolymers of 1-acylbicyclo[1.1.0]butanes of this invention are high molecular weight, solid, thermoplastic polymers which are useful for preparing shaped objects of all sorts, such as films, fibers, tubes, pipes, bottles, and molded objects of many shapes. Solution casting, "dry" spinning from solution, melt extrusion, injection molding, compression molding, and blow molding may be employed.

The carbonyl function which is a fundamental characteristic of all the polymers of this invention may be subjected to further chemical reaction to vary the functionality of the polymer. Such reactions may be used for attaching a dye or color-forming group, particularly in fibers, and may serve as a functional group for crosslinking the polymer by reaction with a crosslinking agent, such as a polyalcohol, a polyamine, or the like.

The following examples illustrate the invention in further detail but are not meant to limit the invention in any respect. Unless otherwise indicated, parts are by weight.

EXAMPLE 1

Part A—3-hydroxycyclobutanecarbonitrile

To a stirred solution of 2.25 g. (0.060 mole) of sodium borohydride in 50 ml. of water was added with stirring a warm slurry of 19.0 g. (0.20 mole) of 3-cyanocyclobutanone in 50 ml. of water. The reaction was mildly exothermic and ice cooling was used to maintain the temperature at 35°. After the addition was complete, the solution was stirred at room temperature for 4 hours and was extracted continuously overnight with chloroform. The chloroform extract was dried and distilled to give 16.79 g. (86.5%) of 3-hydroxycyclobutanecarbonitrile in the form of a colorless liquid, B.P. 70–71° (0.33 mm.).

Part B—3-chlorocyclobutanecarbonitrile

To a stirred solution of 14.03 g. (0.145 mole) of 3-hydroxycyclobutanecarbonitrile, 12.0 g. (0.152 mole) of dry pyridine and 25 ml. of chloroform was added at 0–5° a solution of 19.80 g. (0.166 mole) of thionyl chloride in 25 ml. of chloroform during 38 minutes. The solution was allowed to warm to room temperature with stirring. With continued stirring during 2 hours, the temperature was raised to 56° and during an additional 2 hours to 65°. The solution was cooled and washed with 500 ml. of water containing 10 ml. of 37% hydrochloric acid, with 500 ml. of water containing 10 g. of sodium hydroxide, and with 500 ml. of water containing 10 g. of potassium chloride. It was dried with magnesium sulfate and distilled in a small spinning-band column to give 13.69 g. (81.7%) of 3-chlorocyclobutanecarbonitrile, B.P. 98° (28 mm.).

Part C—Phenyl 3-chlorocyclobutyl ketone

To a stirred solution of 13.8 parts 3-chlorocyclobutanecarbonitrile in 105 parts of anhydrous ether in a system blanketed with nitrogen was added 21.8 parts phenylmagnesium bromide in 20 parts of ether. This mixture was heated under reflux for 3 hours and then poured into 200 parts of cold 6 N hydrochloric acid. The organic phase was separated and the aqueous phase extracted twice with 212.4 parts ether. The combined ether extracts were washed with 200 parts of saturated aqueous sodium bicarbonate. The product was isolated by vacuum distillation which gave 12 parts of phenyl 3-chlorocyclobutyl ketone, B.P. 76–78°/7μ.

*Analysis.*—Calcd. for $C_{11}H_{11}ClO$: C, 67.90; H, 5.65; Cl, 18.25; M.W., 194.7. Found: C, 68.54; H, 5.68; Cl, 17.70; M.W., 191; C, 68.48; H, 5.64.

Part D—1-benzoylbicyclo[1.1.0]butane

To a stirred solution of 4.5 parts of potassium tert-butoxide in 30 parts of dry tetrahydrofuran at 0–3° was added a solution of 6.6 parts of phenyl 3-chlorocyclobutyl ketone in 5 parts of dry tetrahydrofuran. This mixture was then stirred at 0° for 1½ hours. To this reaction mixture was added 75 parts of saturated aqueous potassium chloride. The organic layer was separated and washed twice with 25 parts each of saturated aqueous potassium chloride. The organic layer was dried over molecular sieves and the solvent evaporated under reduced pressure to yield 1-benzoylbicyclo[1.1.0]butane in the form of an oily liquid.

Part E—Poly 1-benzoylbicyclo[1.1.0]butane

The 1-benzoylbicyclo[1.1.0]butane obtained in Part D was allowed to stand overnight at room temperature. It polymerized spontaneously to a hard, brittle solid. The polymer was dissolved in 50 parts of benzene and precipitated in 500 parts methanol. The infrared spectrum showed a carbonyl band at 5.95μ. The polymer showed an inherent viscosity of .04, at 25°; Tg was observed at 138°. The polymer was stable up to 421° C.

*Analysis.*—Calcd. for $[C_{11}H_{10}O]_n$: C, 83.52; H, 6.37. Found: C, 83.39; H, 6.58; C, 82.70; H, 6.50; C, 82.78; H, 6.54.

EXAMPLE 2

Part A—Methyl 3-chlorocyclobutyl ketone

To a stirred solution of 58 parts of 3-chlorocyclobutanecarbonitrile in 354 parts of anhydrous ether in a system blanketed with nitrogen was added 90.6 parts of methylmagnesium bromide in 82 parts of ether. This mixture was heated under reflux for one hour, and then poured into 250 parts of 3 N hydrochloric acid. The organic phase was separated and the aqueous phase extracted twice with 70 parts of ether each. The combined ether extracts were washed with 300 parts of saturated aqueous sodium bicarbonate and then with 300 parts of water. The products isolated by distillation under reduced pressure were 6 parts 1-cyanobicyclo[1.1.0]butane and 7 parts methyl 3-chlorocyclobutyl ketone, B.P. 80°/10 mm. The infrared, NMR and mass spectra of the latter were consistent with the structure methyl 3-chlorocyclobutyl ketone.

Part B—1-acetylbicyclo[1.1.0]butane

To a stirred mixture of 1.20 parts of sodium hydride in 50 parts of distilled N-methylpyrrolidone under a blanket of nitrogen was added 6.6 parts methyl 3-chlorocyclobutyl ketone. The mixture was stirred at 20–25° until hydrogen evolution ceased. The mixture was then poured into 200 parts ether and 100 parts of saturated ammonium chloride. This mixture was shaken in a separatory funnel and the organic layer separated. The ether layer was washed twice with 100 parts of cold water. The ether extract was then dried over molecular sieves and the ether evaporated under reduced pressure. The remaining product was distilled to give 0.56 part of 1-acetylbicyclo[1.1.0]butane, B.P. 39°/8 mm. The infrared and NMR spectra were in accordance with the proposed structure.

Part C—Poly 1-acetylbicyclo[1.1.0]butane

When a sample of 1-acetylbicyclo[1.1.0]butane was dissolved in carbon tetrachloride and allowed to stand overnight at room temperature, a white polymer formed. A transparent, tough film was cast from a dimethylformamide solution. The polymer showed an inherent viscosity at 1.96 at 25° in dimethylformamide.

EXAMPLE 3

Part A—3-chlorocyclobutanecarboxaldehyde

To a solution of 15.5 parts of phenyl 3-chlorocyclobutanecarboxylate in 5 parts of tetrahydrofuran at 0° C. was added 13.9 parts of lithium tri-tert-butoxy-aluminohydride in 57 parts of tetrahydrofuran. This mixture was stirred at 0° for 4 hours and hydrolyzed with 10 parts 5 N sulfuric acid. The organic layer was separated and the aqueous layer extracted twice with 100 parts of pentane. The combined extracts were washed with 100 parts 5% sodium bicarbonate and four 100 parts of water. Distillation gave 5.5 parts of 3-chlorocyclobutanecarboxaldehyde, B.P. 70–74°/21 mm. The 2,4-dinitrophenylhydrazone derivative showed a melting point of 168–169°.

*Analysis.*—Calcd. for $C_{11}H_{11}ClN_4O_4$: C, 44.20; H, 3.71; Cl, 11.90; N, 18.70. Found: C, 44.37; H, 3.62; Cl, 12.93; N, 18.48.

Part B—1-bicyclo[1.1.0]butanecarboxaldehyde

To a stirred mixture of 0.72 part of sodium hydride in 75 parts of dry N-methylpyrrolidone under a blanket of nitrogen was added 3.7 parts of 3-chlorocyclobutanecarboxaldehyde. This mixture was stirred until hydrogen evolution ceased and was then treated with a mixture of 100 parts of ether and 150 parts of a saturated aqueous ammonium chloride solution. The organic layer was separated and the aqueous layer was extracted twice with 100 parts of ether. The combined ether extracts were washed once with 500 parts dilute hydrochloric acid (pH 3) and then dried over anhydrous sodium sulfate. The solvent was evaporated under reduced pressure and the product distilled to give 0.8 part of 1-bicyclo[1.1.0]butanecarboxaldehyde, B.P. 41–46°/30 mm. The infrared and NMR spectra were in accordance with the proposed structure. The mass spectrum showed the product to be present.

Part C—Poly 1-bicyclo[1.1.0]butanecarboxaldehyde

The aldehyde obtained in Part B polymerized to a clear tough polymer when it was allowed to stand overnight at room temperature.

EXAMPLE 4

Part A—Phenyl 3-methylenecyclobutyl ketone

To a solution of 9.3 parts of 3-methylenecyclobutanecarbonitrile in 100 ml. of ether was added 18.1 parts phenylmagnesium bromide in 150 parts ether. This mixture was heated under reflux for 2 hours. This mixture was then poured into 200 parts cold water and 36 parts HCl and stirred for 30 minutes. The organic layer was separated and dried over anhydrous sodium sulfate. Evaporation of the solvent gave 15 parts of phenyl 3-methylenecyclobutyl ketone. A 2,4-dinitrophenylhydrazone derivative showed a melting point of 119–121°.

*Analysis.*—Calcd for $C_{18}H_{14}N_4O_4$: C, 61.36; H, 4.58; N, 15.90; M.W., 352. Found: C, 61.63; H, 4.50; N, 15.81; M.W., 341; C, 61.63; H, 4.59; N, 16.00.

Part B—3-methyl-1-benzoylbicyclo[1.1.0]butane

To 255 parts of 55–58% hydroiodic acid cooled with an ice bath was added with vigorous stirring 25.6 parts of phenyl 3-methylenecyclobutyl ketone. This mixture was stirred at 0° for one hour and at 25° for 2 hours. The layers were separated, and the aqueous layer was extracted with methylene chloride. The combined organic and methylene chloride layers were rinsed with 100 parts of water, decolorized with 100 parts 5% sodium thiosulfate, dried over anhydrous sodium sulfate, filtered, and the solvent removed in vacuo. There was obtained 54.2 parts of cis- and trans-phenyl 3-iodo-3-methylcyclobutyl ketone. This was added to 126 parts of anhydrous ether and 4.1 parts sodium hydride and stirred at room temperature for 36 hours. This mixture was filtered and the solids washed with 8 to 10 parts of ether. The combined ether extracts were washed with water and then dried over anhydrous sodium sulfate. The solvent was evaporated and the product distilled under reduced pressure to give 12 parts of 3-methyl-1-benzoylbicyclo[1.1.0]butane, B.P. 67–70°/15 mm. The infrared and NMR spectra were consistent with the assigned structure.

EXAMPLE 5

Part A—Methyl 3-methylenecyclobutyl ketone

To 88.9 parts of 3-methylenecyclobutanecarbonitrile in 1000 parts of dry ether was added 125 parts methylmagnesium bromide in 225 parts of ether. This mixture was heated under reflux for one hour and then poured into 40 parts HCl in 200 parts cold water. The organic layer was separated and the aqueous layer was extracted twice with 400 parts each of ether. The combined ether extracts were washed with 500 parts of saturated aqueous sodium bicarbonate and then dried over anhydrous sodium sulfate. The solvent was evaporated to give 85 parts of methyl 3-methylenecyclobutyl ketone, B.P. 70–72°/40 mm.

*Analysis.*—Calcd for $C_7H_{10}O$: C, 76.33; H, 9.15. Found: C, 75.81; H, 9.36; C, 75.21; H, 9.37.

Part B.—1-acetyl-3-methylbicyclo[1.1.0]butane

To 255 parts of 55–58% hydroiodic acid cooled with an ice bath was added with vigorous stirring 28.8 parts of methyl 3-methylenecyclobutyl ketone. This mixture was stirred at 0° for 1 hour and at 25° for 2 hours. The layers were separated, and the aqueous layer was extracted with methylene chloride. The combined organic and methylene chloride layers were rinsed with 100 parts of water, decolorized with 100 parts 5% sodium thiosulfate, dried over anhydrous sodium sulfate, filtered, and the solvent removed in vacuo. There was obtained 35.4 parts of methyl 3-iodo-3-methylcyclobutyl ketone. This was added to 100 parts of anhydrous ether and 4.0 parts sodium hydride and stirred at room temperature for 36 hours. This mixture was filtered and the solids washed with 8 to 10 parts of ether. The combined ether extracts were washed with water and then dried over anhydrous sodium sulfate. The solvent was evaporated and the product distilled under reduced pressure to give 3.4 parts of 1-acetyl-3-methylbicyclo[1.1.0]butane, B.P. 63–65°/10 mm. The infrared ad NMR spectra were consistent with the assigned structure.

When the Grignard reagents shown in column A of Table I below are substituted for methylmagnesium bromide in the procedure of Part A of Example 2, the indicated 1-acyl-3-halocyclobutanes in column B are obtained. When these are substituted for methyl 3-chlorocyclobutyl ketone in the procedure of Part B of Example 2, the 1-acylbicyclo[1.1.0]butanes of column C are obtained. The bicyclo[1.1.0]butanes of column C are converted to high molecular weight polymers by heating in the presence of a free radical-type catalyst, such as $\alpha,\alpha'$-azobisisobutyronitrile.

When the 1-cyano-3-alkylenecyclobutanes shown in column A of Table II below are substituted for 1-cyano-3-methylenecyclobutane in the procedures of Example 4, Parts A and B, the 1-acyl-3-alkyl-3-iodocyclobutanes of column B and the 1-acyl-3-alkylbicyclo[1.1.0]butanes of column C are obtained. By further substitution of the Grignard reagents of column A in Table I for the phenylmagnesium bromide of the procedure of Example 4 as

TABLE I

| Item | (A) Grignard Reagent | (B) 1-acyl-3-halocyclobutane | (C) 1-acylbicyclo[1.1.0]butane |
|---|---|---|---|
| 1 | Allylmagnesium chloride | 1-(3-butenoyl)-3-chlorocyclobutane | 1-(3-butenoyl)bicyclo[1.1.0]butane. |
| 2 | Benzylmagnesium bromide | 1-(phenylacetyl)-3-chlorocyclobutane | 1-(phenylacetyl)bicyclo[1.1.0]butane. |
| 3 | 2-butenylmagnesium bromide | 1-(3-pentenoyl)-3-chlorocyclobutane | 1-(3-pentenoyl)bicyclo[1.1.0]butane. |
| 4 | Cyclopropylmethylmagnesium bromide | 1-(cyclopropylacetyl)-3-chlorocyclobutane | 1-(cyclopropylacetyl)bicyclo[1.1.0]butane. |
| 5 | 1,1-diethylpropylmagnesium bromide | 1-(trimethylacetyl)-3-chlorocyclobutane | 1-(trimethylacetyl)bicyclo[1.1.0]butane. |
| 6 | 3,7-dimethyl-2,6-octadienylmagnesium chloride | 1-(4,8-dimethyl-3,7-nonadienoyl)-3-chlorocyclobutane. | 1-(4,8-dimethyl-3,7-nonadenoyl)bicyclo[1.1.0]butane. |
| 7 | 9-anthrylmagnesium bromide | 1-(9-anthrylformyl)-3-chlorocyclobutane | 1-(9-anthrylformyl)bicyclo[1.1.0]butane. |
| 8 | Cyclopropylmagnesium chloride | 1-(cyclopropylformyl)-3-chlorocyclobutane | 1-(cyclopropylformyl)bicyclo[1.1.0]butane. |
| 9 | Cyclohexylmagnesium bromide | 1-(cyclohexylformyl)-3-chlorocyclobutane | 1-(cyclohexylformyl)bicyclo[1.1.0]butane. |
| 10 | 1-hexynylmagnesium bromide | 1-(2-heptynoyl)-3-chlorocyclobutane | 1-(2-heptynoyl)bicyclo[1.1.0]butane. |
| 11 | 1-naphthylmagnesium bromide | 1-(1-naphthylformyl)-3-chlorobutane | 1-(1-naphthylformyl)bicyclo[1.1.0]butane. |
| 12 | Octadecylmagnesium chloride | 1-nonadecoyl-3-chlorocyclobutane | 1-nonadecoylbicyclo[1.1.0]butane. |
| 13 | 1-octadecenylmagnesium chloride | 1-(2-nonadecenoyl)-3-chlorocyclobutane | 1-(2-nonadecenoyl)bicyclo[1.1.0]butane. |
| 14 | 2,5-xylylmagnesium chloride | 1-(2,5-dimethylbenzoyl)-3-chlorocyclobutane | 1-(2,5-dimethylbenzoyl)bicyclo[1.1.0]butane. |
| 15 | Durylmagnesium bromide | 1-(2,3,5,6-tetramethylbenzoyl)-3-chlorobutane | 1-(2,3,5,6-tetramethylbenzoyl)bicyclo[1.0.0]butane. |
| 16 | 2,2-diphenylpropylmagnesium chloride | 1-(3,3-diphenylbutyryl)-3-chlorocyclobutane | 1-(3,3-diphenylbutyryl)bicyclo[1.1.0]butane. |
| 17 | 4-biphenylylmagnesium chloride | 1-(4-phenylbenzoyl)-3-chlorocyclobutane | 1-(4-phenylbenzoyl)bicyclo[1.1.0]butane. |
| 18 | Cinnamylmagnesium bromide | 1-(4-phenyl-3-butenoyl)-3-chlorobutane | 1-(4-phenyl-3-butenoyl)bicyclo[1.1.0]butane. |
| 19 | 1-cyclohexen-1-ylmagnesium chloride | 1-(1-cyclohexen-1-ylformyl)-3-chlorocyclobutane | 1-(1-cyclohexen-1-ylformyl)bicyclo[1.1.0]butane. |
| 20 | Cyclopentadienylmagnesium bromide | 1-(cyclopentadienylformyl)-3-chlorocyclobutane | 1-(cyclopentadienylformyl)bicyclo[1.1.0]butane. |
| 21 | Ethylnylmagnesium bromide | 1-propioloyl-3-chlorocyclobutane | 1-propioloylbicyclo[1.1.0]butane. |
| 22 | 2-naphthylmethylmagnesium bromide | 1-(2-naphthylacetyl)-3-chlorocyclobutane | 1-(2-naphthylacetyl)bicyclo[1.1.0]butane. |
| 23 | 1-hexadecylvinylmagnesium chloride | 1-(2-hexadecylacryloyl)-3-chlorocyclobutane | 1-(2-hexadecylacryloyl)bicyclo[1.1.0]butane. |
| 24 | Vinylmagnesium bromide | 1-acryloyl-3-chlorocyclobutane | 1-acryloylbicyclo[1.1.0]butane. |
| 25 | Styrylmagnesium bromide | 1-cinnamoyl-3-chlorocyclobutane | 1-cinnamoylbicyclo[1.1.0]butane. |
| 26 | Terphenylylmagnesium chloride | 1-(terphenylylformyl)-3-chlorocyclobutane | 1-(terphenylylformyl)bicyclo[1.1.0]butane. |
| 27 | o-Fluorophenylmagnesium bromide | 1-(o-fluorobenzoyl)-3-chlorocyclobutane | 1-(o-fluorobenzoyl)bicyclo[1.1.0]butane. |
| 28 | p-Bromophenylmagnesium bromide | 1-(p-bromobenzoyl)-3-chlorocyclobutane | 1-(p-bromobenzoyl)bicyclo[1.1.0]butane. |
| 29 | Pentachlorophenylmagnesium chloride | 1-pentachlorobenzoyl-3-chlorocyclobutane | 1-pentachlorobenzoylbicyclo[1.1.0]butane. |
| 30 | 3-chloro-4-ethoxyphenylmagnesium chloride | 1-(3-chloro-4-ethoxybenzoyl)-3-chlorocyclobutane. | 1-(3-chloro-4-ethoxybenzoyl)bicyclo[1.1.0]butane. |
| 31 | 3-chloro-1-naphthylmagnesium chloride | 1-(3-chloro-1-naphthylformyl)-3-chlorocyclobutane | 1-(3-chloro-1-naphthylformyl)bicyclo[1.1.0]butane. |
| 32 | p-(Diethoxymethyl)phenylmagnesium chloride | 1-[p-(diethoxymethyl)benzoyl]-3-chlorocyclobutane | 1-(p-[diethoxymethyl]benzoyl)bicyclo[1.1.0]butane. |
| 33 | 2,2-difluoroethylmagnesium chloride | 1-(3,3-difluoropionyl)-3-chlorocyclobutane | 1-(3,3-difluoropionyl)bicyclo[1.1.0]butane. |
| 34 | 3-ethoxy-2-methylpropenylmagnesium bromide | 1-(4-ethoxy-3-methyl-2-butanoyl)-3-chlorocyclobutane | 1-(4-ethoxy-3-methyl-2-butenoyl)bicyclo[1.1.0]butane. |
| 35 | Heptafluoropropylmagnesium bromide | 1-heptafluorobutyryl-3-chlorocyclobutane | 1-heptafluorobutyrylbicyclo[1.1.0]butane. |
| 36 | 4-methoxy-2-naphthylmagnesium bromide | 1-(o-methoxy-2-naphthylformyl)-3-chlorocyclobutane. | 1-(6-methoxy-2-naphthylformyl)bicyclo[1.1.0]butane. |
| 37 | Trifluoromethylmagnesium iodide | 1-trifluoroacetyl-3-chlorocyclobutane | 1-trifluoroacetylbicyclo[1.1.0]butane. |
| 38 | Trifluorovinylmagnesium iodide | 1-trifluoroacryloyl-3-chlorocyclobutane | 1-trifluoroacryloylbicyclo[1.1.0]butane. | indicated in Table II, a still wider variety of 1-acylbicyclo-[1.1.0]butanes are obtained. All of the aforementioned 1-acylbicyclo[1.1.0]butanes are converted to their polymers by heating in the presence of a free-radical-generating initiator, an anionic initiator, a cationic initiator, or a coordination-type initiator as shown above.

6. The compound of claim 1 having the name 3-methyl-1-benzoylbicyclo[1.1.0]butane.

7. The compound of claim 1 having the name 1-acetyl-3-methylbicyclo[1.1.0]butane.

8. A film and fiber forming homopolymer of the monomer defined in claim 1.

TABLE II

| Item | (A) 1-cyano-3-alkylenecyclobutane | (B) 1-acyl-3-alkyl-3-iodocyclobutane | (C) 1-acyl-3-alkylbicyclo[1.1.0]butane |
|---|---|---|---|
| 1 | 1-cyano-3-methylene-2-phenylcyclobutane | 1-benzoyl-3-iodo-3-methyl-2-phenylcyclobutane. | 1-benzoyl-3-methyl-2-phenylbicyclo[1.1.0]butane. |
| 2 | 1-cyano-2,2-diethyl-3-methylenecyclobutane | 1-benzoyl-2,2-diethyl-3-iodo-3-methylcyclobutane. | 1-benzoyl-2,2-diethyl-3-methylbicyclo[1.1.0]butane. |
| 3 | 1-cyano-3-isopropylidenecyclobutane | 1-benzoyl-3-iodo-3-isopropylcyclobutane | 1-benzoyl-3-isopropylbicyclo[1.1.0]butane. |
| 4 | 1-cyano-2,2-di(n-butyl)-4-methyl-3-methylenecyclobutane. | 1-benzoyl-2,2-di(n-butyl)-3-iodo-3,4-dimethylcyclobutane. | 1-benzoyl-2,2-di(n-butyl)-3,4-dimethylbicyclo[1.1.0]butane. |
| 5 | 1-cyano-2-methyl-3-(5-nonylidene)cyclobutane. | 1-benzoyl-3-iodo-2-methyl-3-(5-nonyl)cyclobutane. | 1-benzoyl-2-methyl-3-(5-nonyl)bicyclo[1.1.0]butane. |
| 6 | 1-cyano-2-dodecyl-3-methylene-4-phenylcyclobutane. | 1-benzoyl-2-dodecyl-3-iodo-3-methyl-4-phenylcyclobutane. | 1-benzoyl-2-dodecyl-3-methyl-4-phenylbicyclo[1.1.0]butane. |
| 7 | 1-cyano-2-phenyl-3-tridecylidenecyclobutane | 1-benzoyl-3-iodo-2-phenyl-3-tridecylcyclobutane. | 1-benzoyl-2-phenyl-3-tridecylbicyclo[1.1.0]butane. |
| 8 | 2-n-butyl-1-cyano-3-(9-heptadecylidene)-2-methylcyclobutane. | 1-benzoyl-2-n-butyl-3-(9-heptadecyl)-3-iodo-2-methylcyclobutane. | 1-benzoyl-2-n-butyl-3-(9-heptadecyl)-2-methylbicyclo[1.1.0]butane. |
| 9 | 1-cyano-4-decyl-3-isopropylidene-2,2-dimethylcyclobutane. | 1-benzoyl-4-decyl-3-iodo-3-isopropyl-2,2-dimethylcyclobutane. | 1-benzoyl-4-decyl-3-isopropyl-2,2-dimethylbicyclo[1.1.0]butane. |
| 10 | 1-cyano-4-cyclohexyl-2-cyclopropyl-2-methyl-3-methylenecyclobutane. | 1-benzoyl-4-cyclohexyl-2-cyclopropyl-3-iodo-2,3-dimethylcyclobutane. | 1-benzoyl-4-cyclohexyl-2-cyclopropyl-2,3-dimethylbicyclo[1.1.0]butane. |
| 11 | 1-cyano-3-cyclohexylmethylene-2-cyclopropyl-2-methylcyclobutane. | 1-benzoyl-3-cyclohexylmethyl-2-cyclopropyl-3-iodo-2-methylcyclobutane. | 1-benzoyl-3-cyclohexylmethyl-2-cyclopropyl-2-methylbicyclo[1.1.0]butane. |
| 12 | 2-benzyl-1-cyano-2-methyl-3-methylene-4-tridecylcyclobutane. | 1-benzoyl-2-benzyl-3-iodo-2,3-dimethyl-4-tridecylcyclobutane. | 1-benzoyl-2-benzyl-2,3-dimethyl-4-tridecylbicyclo[1.1.0]butane. |
| 13 | 2-benzyl-1-cyano-2-methyl-3-tetradecylidenecyclobutane. | 1-benzoyl-2-benzyl-3-iodo-2-methyl-3-tetradecylcyclobutane. | 1-benzoyl-2-benzyl-2-methyl-3-tetradecylbicyclo[1.1.0]butane. |
| 14 | 1-cyano-3-methylene-2,2-diphenylcyclobutane | 1-cyano-3-iodo-3-methyl-2,2-diphenylcyclobutane. | 1-benzoyl-3-methyl-2,2-diphenylbicyclo[1.1.0]butane. |
| 15 | 1-cyano-3-methylene-2-(β-naphthyl)cyclobutane. | 1-benzoyl-3-iodo-3-methyl-2-(β-naphthyl)cyclobutane. | 1-benzoyl-3-methyl-2-(β-naphthyl)bicyclo[1.1.0]butane. |
| 16 | 1-cyano-2-(α-naphthyl)-2-phenyl-3-(1-phenyl-1-p-tolyl)-methylenecyclobutane. | 1-benzoyl-3-iodo-2-(α-naphthyl)-2-phenyl-3-(1-phenyl-1-p-tolyl)methylcyclobutane. | 1-benzoyl-2-(α-naphthyl)-2-phenyl-3-(1-phenyl-1-p-tolyl)methylbicyclo[1.1.0]butane. |
| 17 | 1-cyano-3-(β-cyclohexylethylidene)cyclobutane. | 1-benzoyl-3-(β-cyclohexylethyl)-3-iodocyclobutane. | 1-benzoyl-3-(β-cyclohexylethyl)bicyclo[1.1.0]butane. |
| 18 | 1-cyano-2-cyclohexylmethyl-3-methylenecyclobutane. | 1-benzoyl-2-cyclohexylmethyl-3-iodo-3-methylcyclobutane. | 1-benzoyl-2-cyclohexylmethyl-3-methylbicyclo[1.1.0]butane. |

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A compound of the formula

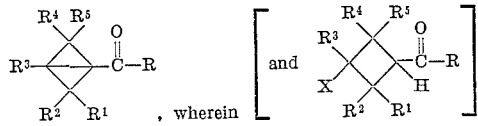

, wherein

R is selected from the class consisting of hydrogen, hydrocarbyl of 1 to 19 carbon atoms, and substituted hydrocarbyl of 1 to 19 carbon atoms in which the substituents are selected from the class consisting of halogen, lower alkoxy and mixtures thereof and $R^1$, $R^2$, $R^3$, $R^4$ and $R^5$ are each individually selected from the class consisting of hydrogen and hydrocarbyl of 1 to 19 carbon atoms that is free of aliphatic unsaturation.

2. A compound of claim 1 wherein R is hydrogen, lower alkyl or phenyl and $R^1$, $R^2$, $R^3$, $R^4$ and $R^5$ are each hydrogen or lower alkyl.

3. The compound of claim 1 having the name 1-benzoyl-bicyclo[1.1.0]butane.

4. The compound of claim 1 having the name 1-acetyl-bicyclo[1.1.0]butane.

5. The compound of claim 1 having the name 1-bicyclo-[1.1.0]butanecarboxaldehyde.

9. Process for preparing compounds of claim 1 which comprises reacting a compound of the formula

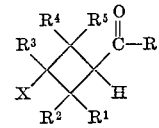

wherein R, $R^1$, $R^2$, $R^3$, $R^4$ and $R^5$ are defined as in claim 1 and X is a halogen of atomic number 17 through 53, with a dehydrohalogenating agent.

10. Process which comprises polymerizing a compound of claim 1 in the presence of an organic solvent and an initiating catalyst, and at a temperature of between −100° C. and 160° C.

References Cited

UNITED STATES PATENTS 3,234,264   2/1966   Blanchard _____ 260—464
3,393,159   7/1966   Blanchard _____ 260—2

WILLIAM H. SHORT, Primary Examiner

L. L. LEE, Assistant Examiner

U.S. Cl. X.R.

117—161; 260—67, 586, 598

PO-1050
(5/69)

UNITED STATES PATENT OFFICE
CERTIFICATE OF CORRECTION

Patent No. 3,485,798      Dated    December 23, 1969

Inventor(s)   Claibourne D. Smith

It is certified that error appears in the above-identified patent and that said Letters Patent are hereby corrected as shown below:

Col. 2, l. 20, insert -- and -- between "above" and "$\underline{n}$";

Col. 3, l. 4, insert a comma between "helium" and "argon"; line 75, correct spelling of -- aluminumtetradecyl --;

Col. 8, l. 16, correct spelling of -- and --;

Table I, Item 5, col. "(C)", change "1-(trimethylacetyl) to -- 1-(triethylacetyl)--; Item 11, col. "(B)", change "chlorobutane" to -- chlorocyclobutane --; Item 15, col."(B)" change "chlorobutane" to -- chlorocyclobutane --; Item 15, col."(C)", change "bicyclo[1.0.0]" to -- bicyclo[1.1.0] --; Item 18, col. "(B)", change "chlorobutane" to -- chlorocyclobutane --; Item 34, col. "(B)", change "butanoyl" to -- butenoyl --; and Item 36, change "1-(o-..." to -- 1-(6-... -- in col. "(B)";

Table II, Item 6, col. "(B)", change "...phenylbutane" to -- ...phenylcyclobutane --; Item 7, col. "(B)", change "...-tridecyclobutane..." to -- ...-tridecylcyclobutane...--; and Claim 1, delete the formula within the brackets.

SIGNED AND
SEALED
AUG 4 - 1970

(SEAL)
Attest:

Edward M. Fletcher, Jr.
Attesting Officer

WILLIAM E. SCHUYLER, JR.
Commissioner of Patents